United States Patent
Kim et al.

[11] Patent Number: 5,950,758
[45] Date of Patent: Sep. 14, 1999

[54] REAR WHEEL NEUTRALIZING SYSTEM FOR A FOUR-WHEEL STEERING VEHICLE AND METHOD FOR CONTROLLING THE SAME

[75] Inventors: Sung-ha Kim; Young-eun Ko, both of Seoul, Rep. of Korea

[73] Assignee: Kia Motors Corporation, Seoul, Rep. of Korea

[21] Appl. No.: 08/736,756

[22] Filed: Oct. 25, 1996

[30] Foreign Application Priority Data

Jun. 4, 1996 [KR] Rep. of Korea ................ 96-19716

[51] Int. Cl.⁶ .................................................. B62D 5/06
[52] U.S. Cl. ..................... 180/410; 180/408; 180/411; 701/43
[58] Field of Search .................................. 180/408, 410, 180/411, 412, 413; 701/41, 43

[56] References Cited

U.S. PATENT DOCUMENTS

| | | | |
|---|---|---|---|
| 4,660,844 | 4/1987 | Yamamoto et al. | 180/410 |
| 4,716,981 | 1/1988 | Murao | 180/412 |
| 4,782,907 | 11/1988 | Morishita et al. | 180/412 |
| 4,880,073 | 11/1989 | Konno | 180/412 |
| 5,257,191 | 10/1993 | Takehara et al. | 180/412 |
| 5,346,030 | 9/1994 | Ohmura et al. | 180/412 |
| 5,400,250 | 3/1995 | Ohmura | 180/410 |
| 5,533,584 | 7/1996 | Johnson | 180/410 |
| 5,554,969 | 9/1996 | Eguchi | 180/412 |

*Primary Examiner*—Daniel G. DePumpo

[57] ABSTRACT

Disclosed is a rear wheel neutralizing system for a four-wheel steering vehicle, including an actuator for returning rear wheels to their neutral positions; a potentiometer for detecting a returning displacement to the neutral position of the wheel; a motor for operating the actuator; a vehicle speed sensor for detecting vehicle speeds; and an electronic control unit for determining whether the four-wheel steering system is malfunctioning and for operating the motor while receiving a signal from the vehicle speed sensor. The rear wheel neutralizing system further comprises an encoder for detecting the angular velocity of the motor and transmitting a signal on the angular velocity to the electronic control unit.

3 Claims, 2 Drawing Sheets

REAR WHEEL NEUTRALIZING SYSTEM FOR A FOUR-WHEEL STEERING VEHICLE AND METHOD FOR CONTROLLING THE SAME

FIELD OF THE INVENTION

The present invention relates to a rear wheel neutralizing system for a four-wheel steering vehicle and a method for controlling the same and, more particularly, to a rear wheel neutralizing system that converts a four-wheel steering state into a front-wheel steering state by returning rear wheels to their neutral positions at an appropriate speed with respect to current vehicle speed when a rear wheel steering part malfunctions while the vehicle is being driven.

DESCRIPTION OF RELATED ART

Four-wheel steering vehicles are designed such that rear wheels can be optimally steered in response to both front wheel angle and vehicle speed, thereby providing driving safety, ease of lane change, good cornering balance, and a small turning diameter compared with two-wheel steering systems.

In such four-wheel steering systems, there are generally two methods for coping with rear wheel steering part malfunction while the vehicle is being driven. One which method which maintains the rear wheels in a steered state at the time of malfunction, and the other which method which returns the rear wheels into their neutral state (straight travelling state).

The advantage of the former method is that, since the rear wheels are maintained in a steered state at the time of malfunction, unexpected shock is not suddenly experienced by the driver. However, when steering the vehicle, the driver undergoes some difficulties.

For example, if the rear wheels are fixed in a steered state, the driver has trouble maintaining the vehicle in a straight travelling state or turning the vehicle.

Therefore, it has been found that the latter method is more preferable to control the vehicle. However, there is a need for a system that can return the rear wheels to their neutral positions at an appropriate speed with respect to current vehicle speed so as to alleviate driver shock.

SUMMARY OF THE INVENTION

The present invention provides a wheel neutralizing system which converts a four-wheel steering state into a front-wheel steering state by returning rear wheels to their neutral positions at an appropriate speed with respect to current vehicle speed when a rear wheel steering part malfunctions while the vehicle is being driven.

To achieve the above object, the present invention provides a rear wheel neutralizing system for a four-wheel steering vehicle, comprising:

an actuator for returning the rear wheels to their neutral position;

a potentiometer for detecting a returning displacement to the neutral position of the wheel;

a motor for operating the actuator;

a vehicle speed sensor for detecting vehicle speed; and an electronic control unit for determining whether the four-wheel steering system is malfunctioning and for operating the motor while receiving a signal from the vehicle speed sensor.

Preferably, the rear wheel neutralizing system further comprises an encoder for detecting the angular velocity of the motor and transmitting a signal representative of angular velocity to the electronic control unit which compares a desired angular velocity of the motor with an actual angular velocity.

According to a feature of the present invention, the electronic control unit is programmed to control the angular velocity of the motor in an inverse proportion to the vehicle speed.

In another aspect, the present invention provides a method for controlling a rear wheel neutralizing system for a four-wheel steering vehicle, comprising the steps of:

determining a rear wheel neutralizing speed in response to a vehicle speed; and returning the rear wheels to their neutral positions in response to the determined rear wheel neutralizing speed until the rear wheel neutralization is completed.

According to another feature of the invention, the rear wheel neutralizing speed is controlled at an inverse proportion to the vehicle speed.

DETAILED DESCRIPTION OF THE PREFERRED EMBODIMENT

Reference will now be made in detail to the present preferred embodiment of the invention, an example of which is illustrated in the accompanying drawings.

Figure 1:
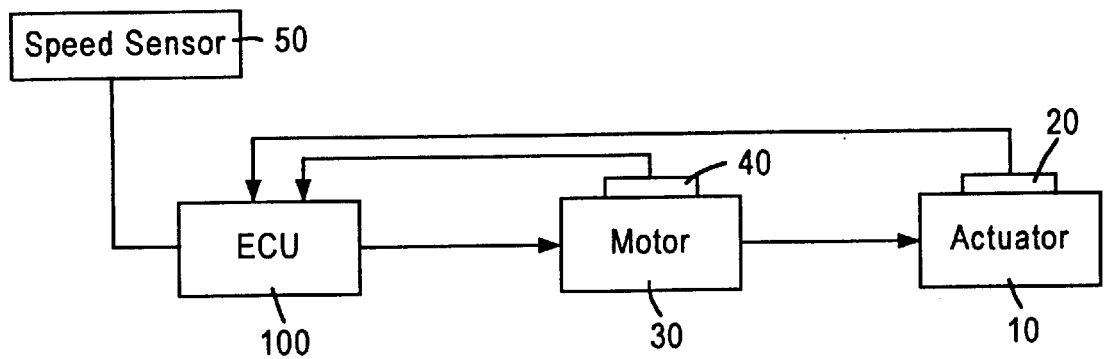
FIG. 1 is a schematic block diagram of a rear wheel neutralizing system in accordance with a preferred embodiment of the present invention.

Referring first to FIG. 1, a rear wheel neutralizing system of a four-wheel steering system of the present invention comprises an actuator 10 for returning rear wheels(not shown) to their neutral positions, a potentiometer 20 for detecting a returning displacement to the neutral position of the wheel, a motor for operating the actuator 10, an encoder 40 for detecting the angular velocity of the motor 30, an electronic control unit ("ECU") 100 for determining whether the four-wheel steering system is malfunctioning and for operating the motor while receiving a signal from a vehicle speed sensor 50.

The ECU 100 rotates the motor 30 while considering the rear wheel neutralizing speed and receives a signal representative of angular velocity of the motor 30 from the encoder 40 to determine whether the motor 30 is rotating at a desired velocity.

If the angular velocity of the motor 30 is different from the ECU desired velocity base upon vehicle speed, the ECU orders a new velocity of the motor 30 to attain a desirable velocity for real wheels neutralization.

The ECU 100 stops the motor when an input signal from potentiometer 20 indicates that the rear wheels have returned to the neutral position.

Although it is preferable for the rear wheels to be returned to the neutral position as fast as possible, this is dangerous even if the rear wheel steering angle is very small when the vehicle is driven at high speeds. Therefore, the rear wheel neutralizing speed should be determined as a function the vehicle speed.

Figure 2:
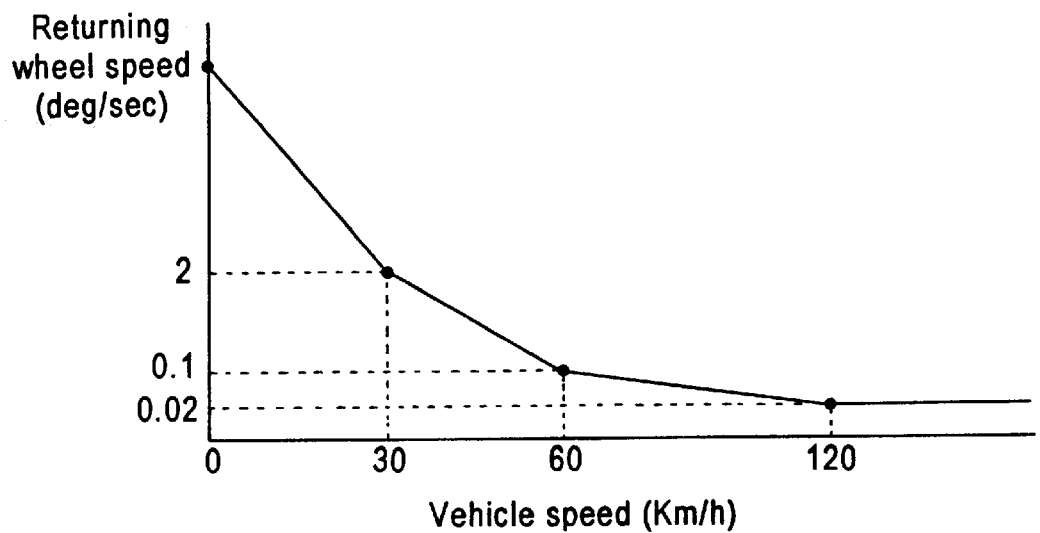
FIG. 2 is a graph of desired rear wheel neutralizing speed variation with respect to vehicle speed variation in a rear wheel neutralizing system of the present invention, in which the ratios are example data obtained from a specific type of a vehicle.

As shown in FIG. 2, the vehicle speed is inversely proportional to the rear wheel neutralizing speed. Assuming that the maximum rear wheel steering angle is about 7 degrees, the rear wheel neutralizing speed which can be determined to be safe based on vehicle speed, is obtained from experience. For example, it has been found that when the vehicle is being driven at a speed of about 30 km/hour, a safe neutralizing speed of the rear wheels is about 2 degree/sec. When the vehicle is being driven at a speed of about 60 km/hour, a safe neutralizing speed of the rear wheels is about 0.1 degree/sec. In addition, when the vehicle is being driven at a speed of about 120 km/hour, a safe neutralizing speed of the rear wheels is about 0.02 degree/sec.

Consequently, it has been found that when the rear wheels are returned to the neutral position in accordance with the relationship between a rear wheel neutralizing speed and vehicle speed as illustrated in FIG. 2, shock transmitted to a vehicle body is minimized.

Since the relationship between rear wheel neutralizing speed and vehicle speed, which is illustrated in FIG. 2, is based on a specific type of vehicle, the relationship can be different for each vehicle type. However, as described above, the vehicle speed and the rear wheel neutralizing speed should be controlled in inverse proportion to each other regardless of the type of vehicle.

The vehicle speed sensor 50 continuously transmits a signal representative of vehicle speed to the ECU 100. The ECU 100 drives motor 30 in response to the signals on the basis of the pre-set information between the rear wheel neutralizing speed and the vehicle speed.

The operation is repeated until the ECU determines that the rear wheel neutralization is completed according to information from the potentiometer.

Figure 3:
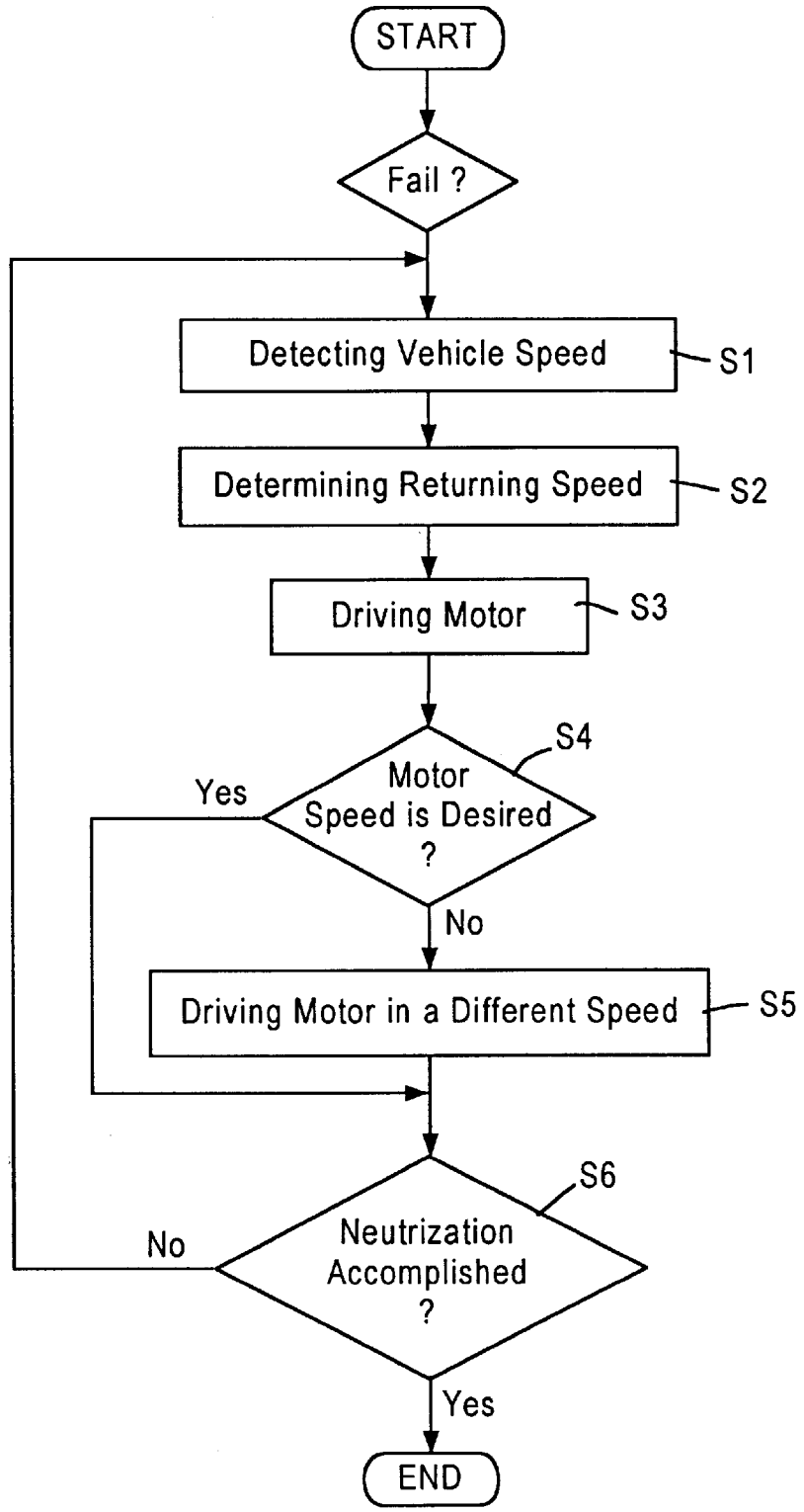
FIG. 3 is a flow chart of a rear wheel neutralizing method in accordance with a present invention.

Referring to FIG. 3 which illustrates a rear wheel neutralizing method in accordance with a present invention, when the ECU determines that the four-wheel steering sensor is malfunctioning, as a first step S1, a signal is transmitted to the ECU 100 from the vehicle speed sensor 50.

The ECU 100, as a second step S2, determines the rear wheel neutralizing speed on the basis of the signal from the vehicle speed sensor.

As a third step S3, the ECU drives the motor 30 to thereby drive the actuator in response to the determined rear wheel neutralizing speed. The ECU, as a fourth step S4, detects a real angular velocity of the motor 30 by means of the encoder 40 in order to check whether the motor 30 rotates in a desired angular velocity. If the motor 30 does not rotate at a desired angular velocity, the ECU controls the motor to rotate at a different velocity, as step S5.

The ECU, as a final step S6, determines if the rear wheel neutralization is completed or not in response to a signal from the potentiometer 20 which detects the displacement of rear wheel neutralization made by the operation of the actuator.

When the rear wheel neutralization is completed, the ECU stops the motor 30 and, if not completed, the above-described processes are repeated until the rear wheel neutralization is completed.

While this invention has been described in connection with what is presently considered to be the most practical and preferred embodiments, it is to be understood that the invention is not limited to the disclosed embodiment, but, on the contrary, it is intended to cover various modifications and equivalent arrangements and methods included within the spirit and scope of the appended claims.

What is claimed is:

1. A rear wheel neutralizing system for a four-wheel steering system of a vehicle having front wheels and rear wheels, comprising:

an actuator for returning the rear wheels to a neutral position thereof;

a potentiometer for detecting a returning displacement of the rear wheels to the neutral position;

a motor for operating the actuator;

a vehicle speed sensor for detecting vehicle speed; and an electronic control unit having a program including at least a first control function for determining whether the four-wheel steering system is malfunctioning and a second control function for operating the motor to return the rear wheels to the neutral position when malfunction has occurred, and for stopping the motor when rear wheel neutralization is completed.

2. A rear wheel neutralizing system according to claim 1 further comprising an encoder for detecting the angular velocity of the motor and transmitting a signal representative of the angular velocity to the electronic control unit.

3. A rear wheel neutralizing system according to claim 1, wherein the program of the electronic control unit is programmed to operate the motor by controlling the angular velocity of the motor in an inverse relationship to the vehicle speed.

* * * * *